United States Patent
Desai et al.

(10) Patent No.: US 8,638,802 B2
(45) Date of Patent: *Jan. 28, 2014

(54) NETWORK PACKET STEERING VIA CONFIGURABLE ASSOCIATION OF PACKET PROCESSING RESOURCES AND NETWORK INTERFACES

(75) Inventors: Sachin Desai, Santa Clara, CA (US); Tim Millet, Mountain View, CA (US); Zahid Hussain, San Jose, CA (US); Paul Kim, Fremont, CA (US); Louise Yeung, San Jose, CA (US); Ken Yeung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/305,804

(22) Filed: Nov. 29, 2011

(65) Prior Publication Data

US 2012/0069850 A1    Mar. 22, 2012

Related U.S. Application Data

(63) Continuation of application No. 11/684,614, filed on Mar. 10, 2007, now Pat. No. 8,068,503, and a continuation of application No. 10/163,261, filed on Jun. 4, 2002, now Pat. No. 7,203,192.

(51) Int. Cl.
    *H04L 12/26* (2006.01)
(52) U.S. Cl.
    USPC ............ 370/400; 370/389; 370/392; 370/401
(58) Field of Classification Search
    USPC .................................................. 370/392, 400
    See application file for complete search history.

(56) References Cited

U.S. PATENT DOCUMENTS

| 4,667,287 A | 5/1987 | Allen et al. |
| 5,473,599 A | 12/1995 | Li et al. |
| 5,490,252 A | 2/1996 | Macera et al. |

(Continued)

FOREIGN PATENT DOCUMENTS

| WO | 0051290 | 8/2000 |
| WO | 0076152 | 12/2000 |

(Continued)

OTHER PUBLICATIONS

Notice of Allowance for U.S. Appl. No. 12/328,858 mailed May 25, 2012.

(Continued)

*Primary Examiner* — Man Phan
*Assistant Examiner* — Robert M Morlan

(57) ABSTRACT

Methods and systems are provided for steering network packets. According to one embodiment, a dynamically configurable steering table is stored within a memory of each network interface of a networking routing/switching device. The steering table represents a mapping that logically assigns each of the network interfaces to one of multiple packet processing resources of the network routing/switching device. The steering table has contained therein information indicative of a unique identifier/address of the assigned packet processing resource. Responsive to receiving a packet on a network interface, the network interface performs Layer 1 or Layer 2 steering of the received packet to the assigned packet processing resource by retrieving the information indicative of the unique identifier/address of the assigned packet processing resource from the steering table based on a channel identifier associated with the received packet and the received packet is processed by the assigned packet processing resource.

20 Claims, 3 Drawing Sheets

(56) References Cited

U.S. PATENT DOCUMENTS

| | | |
|---|---|---|
| 5,581,705 A | 12/1996 | Passint et al. |
| 5,633,866 A | 5/1997 | Callon |
| 5,745,778 A | 4/1998 | Alfieri |
| 5,825,772 A | 10/1998 | Dobbins et al. |
| 5,841,973 A | 11/1998 | Kessler et al. |
| 5,875,290 A | 2/1999 | Bartfai et al. |
| 5,963,555 A | 10/1999 | Takase et al. |
| 5,987,521 A | 11/1999 | Arrowood et al. |
| 6,014,382 A | 1/2000 | Takihiro et al. |
| 6,032,193 A | 2/2000 | Sullivan |
| 6,047,330 A | 4/2000 | Stracke |
| 6,069,895 A | 5/2000 | Ayandeh |
| 6,085,238 A | 7/2000 | Yuasa et al. |
| 6,098,110 A | 8/2000 | Witowski et al. |
| 6,118,791 A | 9/2000 | Fichou et al. |
| 6,137,777 A | 10/2000 | Vaid et al. |
| 6,169,739 B1 | 1/2001 | Isoyama |
| 6,169,793 B1 | 1/2001 | Gowdin et al. |
| 6,175,867 B1 | 1/2001 | Taghadoss |
| 6,192,051 B1 | 2/2001 | Lipman et al. |
| 6,212,556 B1 | 4/2001 | Arunachalam |
| 6,220,768 B1 | 4/2001 | Barroux |
| 6,226,788 B1 | 5/2001 | Schoening et al. |
| 6,243,580 B1 | 6/2001 | Garner |
| 6,249,519 B1 | 6/2001 | Rangachar |
| 6,260,072 B1 | 7/2001 | Rodriguez |
| 6,260,073 B1 | 7/2001 | Walker et al. |
| 6,266,695 B1 | 7/2001 | Huang et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,330,602 B1 | 12/2001 | Law et al. |
| 6,338,092 B1 | 1/2002 | Chao et al. |
| 6,405,262 B1 | 6/2002 | Vogel et al. |
| 6,414,595 B1 | 7/2002 | Scrandis et al. |
| 6,434,619 B1 | 8/2002 | Lim et al. |
| 6,449,650 B1 | 9/2002 | Westfall et al. |
| 6,463,061 B1 | 10/2002 | Rekhter et al. |
| 6,466,976 B1 | 10/2002 | Alles et al. |
| 6,526,056 B1 | 2/2003 | Rekhter et al. |
| 6,532,088 B1 | 3/2003 | Dantu |
| 6,542,466 B1 | 4/2003 | Pashtan et al. |
| 6,556,544 B1 | 4/2003 | Lee |
| 6,608,816 B1 | 8/2003 | Nichols |
| 6,614,781 B1 | 9/2003 | Elliott et al. |
| 6,629,128 B1 | 9/2003 | Glass |
| 6,636,516 B1 | 10/2003 | Yamano |
| 6,639,897 B1 | 10/2003 | Shiomoto et al. |
| 6,658,013 B1 | 12/2003 | de Boer et al. |
| 6,697,359 B1 | 2/2004 | George |
| 6,697,360 B1 | 2/2004 | Gai et al. |
| 6,738,371 B1 | 5/2004 | Ayres |
| 6,775,267 B1 | 8/2004 | Kung |
| 6,802,068 B1 | 10/2004 | Guruprasad |
| 6,868,082 B1 | 3/2005 | Allen et al. |
| 6,883,170 B1 | 4/2005 | Garcia |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,985,438 B1 | 1/2006 | Tschudin |
| 7,020,143 B2 | 3/2006 | Zdan |
| 7,042,848 B2 | 5/2006 | Santiago et al. |
| 7,221,945 B2 | 5/2007 | Milford et al. |
| 7,316,029 B1 | 1/2008 | Parker et al. |
| 7,324,489 B1 | 1/2008 | Iyer |
| 8,208,409 B2 | 6/2012 | Millet |
| 8,213,347 B2 | 7/2012 | Balay et al. |
| 2001/0043571 A1 | 11/2001 | Kent et al. |
| 2001/0048661 A1 | 12/2001 | Clear et al. |
| 2001/0052013 A1 | 12/2001 | Munguia et al. |
| 2002/0062344 A1 | 5/2002 | Ylonen et al. |
| 2002/0066034 A1 | 5/2002 | Schlossberg et al. |
| 2002/0075901 A1 | 6/2002 | Perlmutter et al. |
| 2002/0097672 A1 | 7/2002 | Barbas et al. |
| 2002/0099849 A1 | 7/2002 | Alfieri et al. |
| 2002/0152373 A1 | 10/2002 | Sun et al. |
| 2002/0186661 A1 | 12/2002 | Santiago et al. |
| 2002/0191604 A1 | 12/2002 | Mitchell et al. |
| 2003/0033401 A1 | 2/2003 | Poisson et al. |
| 2003/0108041 A1 | 6/2003 | Aysan |
| 2003/0115308 A1 | 6/2003 | Best et al. |
| 2003/0117954 A1 | 6/2003 | De Neve et al. |
| 2003/0131228 A1 | 7/2003 | Tworney |
| 2003/0169747 A1 | 9/2003 | Wang |
| 2003/0200295 A1 | 10/2003 | Roberts et al. |
| 2003/0212735 A1 | 11/2003 | Hickok et al. |
| 2003/0223406 A1 | 12/2003 | Balay |
| 2003/0223418 A1 | 12/2003 | Desai et al. |
| 2004/0042416 A1 | 3/2004 | Ngo et al. |
| 2004/0095934 A1 | 5/2004 | Cheng et al. |
| 2004/0141521 A1 | 7/2004 | George |
| 2006/0087969 A1 | 4/2006 | Santiago et al. |
| 2012/0057460 A1 | 3/2012 | Hussain |
| 2012/0069850 A1 | 3/2012 | Desai |
| 2012/0072568 A1 | 3/2012 | Matthews |
| 2012/0099596 A1 | 4/2012 | Balay |
| 2012/0131215 A1 | 5/2012 | Balay et al. |

FOREIGN PATENT DOCUMENTS

| | | |
|---|---|---|
| WO | 0163809 | 8/2001 |
| WO | 0223855 | 3/2002 |
| WO | 03010323 | 12/2003 |

OTHER PUBLICATIONS

Notice of Allowance for U.S. Appl. No. 12/762,362 mailed May 22, 2012.

Notice of Allowance for U.S. Appl. No. 13/305,743 mailed Jul. 25, 2012.

Notice of Allowance for U.S. Appl. No. 11/530,901 mailed Jul. 20, 2012.

Notice of Allowance for U.S. Appl. No. 09/952,520 mailed Jul. 6, 2012.

Chan, Mun C. et al., "An architecture for broadband virtual networks under customer control." IEEE Network Operations and Management Symposium. Apr. 1996. pp. 135-144.

Chan, Mun C. et al "Customer Management and Control of Broadband VPN Services." Proc. Fifth IFIP/IEEE International Symposium of Integrated Network Management. May 1997. pp. 301-314.

Gasparro, D.M., "Next-Gen VPNs: The Design Challenge." Data Communications. Sep. 1999. pp. 83-95.

Hanaki, M. et al., "LAN/WAN management integration using ATM CNM interface." IEEE Network Operations Management Symposium, vol. 1. Apr. 1996. pp. 12-21.

Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.

Tanenbaum, A.S., "Computer Networks." Upper Saddle River,N.J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

Amendment and Response filed on Nov. 12, 2004 for U.S. Appl. No. 09/663,484.

Office Action dated May 6, 2004 for U.S. Appl. No. 09/663,484.

Amendment and Response filed on Feb. 18, 2004 for U.S. Appl. No. 09/663,484.

Office Action dated Aug. 12, 2003 for U.S. Appl. No. 09/663,484.

(56) References Cited

OTHER PUBLICATIONS

Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.
Non-Final Rejection for U.S. Appl. No. 12/762,362 mailed Feb. 2, 2012.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.

(56) References Cited

OTHER PUBLICATIONS

Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.
Office Action dated Aug. 1, 2007 for U.S. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007, 2007 for U.S. Appl. No. 09/663,457.
Non-Final Rejection for U.S. Appl. No. 13/359,960, mailed Apr. 26, 2012.

NETWORK PACKET STEERING VIA CONFIGURABLE ASSOCIATION OF PACKET PROCESSING RESOURCES AND NETWORK INTERFACES

CROSS-REFERENCE TO RELATED APPLICATIONS

This application is a continuation of U.S. patent application Ser. No. 11/684,614 filed on Mar. 10, 2007, which is a continuation of U.S. patent application Ser. No. 10/163,261, filed on Jun. 4, 2002, now U.S. Pat. No. 7,203,192, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2002-2011, Fortinet, Inc.

BACKGROUND

1. Field

Embodiments of the present invention generally relate to network packet steering, and more particularly to network packet steering from a network interface module to a processing resource, which is used to further route the network packet.

2. Description of the Related Art

In today's highly wired and connected computing environments, networks are often taken for granted by end-users. Yet, heterogeneous networks are often seamlessly and transparently interconnected and made available to the end-users. It is only when a network fails or is degraded that the end-users take notice of the importance associated with having efficient networks.

A network can be configured in many different manners. A Local Area Network (LAN) is a group of computing devices that share a common communications line. Computing and storage resources can be shared within a LAN. Moreover, a LAN can be as small as a few computing devices or as large as an entire enterprise (e.g., office building, office complex, and the like). Another network configuration is a Wide Area Network (WAN). A WAN is a geographically dispersed telecommunications network. A classic example of a well known WAN is the Internet. A third network configuration is a Metropolitan Area Network (MAN), where computing devices are connected in a geographic region or specific area that is larger than a LAN and smaller than the typical WAN. Also, in recent years a new type of Virtual Private Network (VPN) has emerged in the industry. A VPN is a private network that takes advantage of public telecommunications and maintains privacy through use of tunneling protocols and security procedures.

Moreover, networks can be characterized by the type of data transmission technology in use on the networks (e.g., Transmission Control Protocol/Internet Protocol (TCP/IP), and others). Furthermore, the type of data (e.g., voice versus data) that a network can carry can also distinguish the network. Networks are also classified as public or private, by the usual connection techniques used to access the networks (e.g., switched, dial-up, non-switched, dedicated, virtual, and the like), and by the type of physical links used to interface on the networks (fibre optic, coaxial cable, untwisted shielded pair, and the like).

Networks of different types can be interconnected through the use of backbones. A backbone is generally a larger transmission line that carries data gathered from smaller lines that interconnect with it. For example, a LAN may use a backbone to connect with a WAN or to span distances within a single LAN. Further, a WAN may use a backbone as a set of paths that local or regional networks connect to for long-distance interconnections.

When networks are interfaced with one another a number of issues arise. One such issue is how to properly route a received data packet between the networks, since each network may be associated with a different media transmission (e.g., Gigabit Ethernet (GigE), Frame Relay (FR), Time-Division Multiplexing (TDM), Asynchronous Transfer Mode (ATM), and others) and/or a different local data packet-addressing schemes or requirements. Another issue is how to maintain data packet throughput at the point where networks are interfaced with one another. For example, the data packet routing can quickly become a bottleneck in the performance of the network if conversion between disparate media transmissions or addressing schemes is not efficient, especially when a high volume of network traffic is occurring at the point where networks are interfaced together.

Accordingly, a number of software and/or hardware solutions have sought to increase network traffic throughput at the point where networks are interfaced together. Some of these solutions include routers that determine the next network point that a data packet should be forwarded to within a plurality of networks. Similarly, gateways act as network node that serves as an entrance into another network. Additionally, proxy servers and firewalls act as intermediaries between network connections. Hub devices and bridge devices are also used to collect and route data packets between networks.

Networks desiring better security and increased throughput of operation will often dedicate computing resources to house, process, and interconnect external and internal network connections. These computing resources use the solutions discussed above (e.g., routers, gateways, firewalls, proxy servers, hub devices, bridge devices and the like). Moreover, often a plurality of solutions is deployed within the dedicated computing resources.

Some networks that receive a high volume of network traffic often deploy or have computing devices custom developed and installed within the networks to increase operational throughput. For example, Internet Service Providers (ISPs) can have a large number of dedicated and custom developed hardware and software resources to process and route network traffic within the ISP's network. One such hardware and software resource is a high-density server or a blade server that includes physical network interface modules that receive packets from a network. The blade server also includes a switching fabric that passes any received network data packet along to a processing resource within the blade server. The processing resource then properly translates, routes, and/or forwards the received network packet to its destination. In some cases, the destination can be another processing resource within the system.

Conventionally, the dedicated hardware and software resources are hardwired or statically coded by vendors to meet the needs of a particular customer. Yet, when network traffic patterns for a customer's network change (e.g., decreases or increases), the customer cannot efficiently configure the dedicated hardware and software resources provided by the vendors. As a result, to solve network traffic problems, customers purchase additional hardware and software resources to better meet their then-existing needs. As one of ordinary skill in the art readily appreciates, this is inefficient since many times existing hardware and software resources may be underutilized by the customer in another area of the customer's network.

Therefore, there is a need for techniques that provide improved custom configurations of hardware and software resources, which are used to facilitate the throughput and to load balance network traffic.

SUMMARY

Methods and systems are described for steering network packets. According to one embodiment, a dynamically configurable steering table is stored within a memory of each network interface of a networking routing/switching device. The steering table represents a mapping that logically assigns each of the network interfaces to one of multiple packet processing resources of the network routing/switching device. The steering table has contained therein information indicative of a unique identifier/address of the assigned packet processing resource. Responsive to receiving a packet on a network interface, the network interface performs Layer 1 or Layer 2 steering of the received packet to the assigned packet processing resource by retrieving the information indicative of the unique identifier/address of the assigned packet processing resource from the steering table based on a channel identifier associated with the received packet and the received packet is processed by the assigned packet processing resource.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
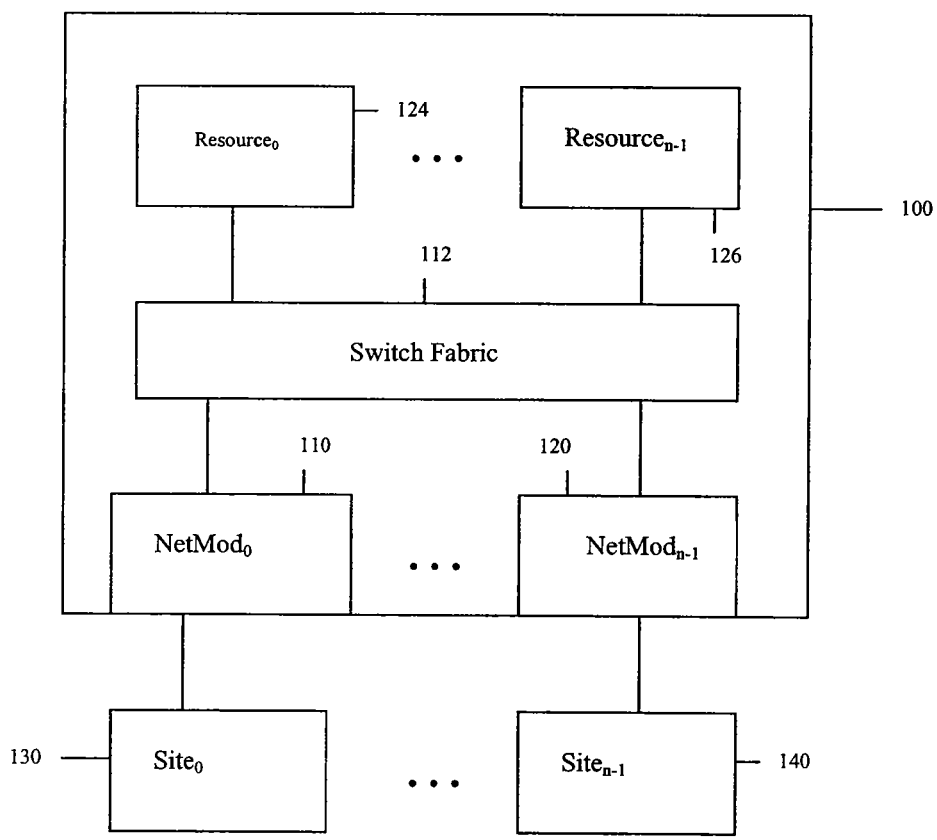
FIG. 1 shows a diagram of a network packet steering system, according to one embodiment of the present invention.

Methods and systems are described for steering network packets. In various embodiments of the present invention, conventional network interfaces (netmods) may be used in connection with the novel teachings, such as the load balancing architecture described herein and/or the more general configurable association of processing resources and netmods and/or line interface ports of the netmods. While embodiments of the present invention are described in the context of netmods that connect to telecommunications lines associated with network feeds, in various embodiments, the netmods may also be connected on the backend (e.g., the side opposite the network feed) to a switching fabric that is used to forward a network data packet received from the netmod to one or more processing resources. The processing resources include one or more processing elements and memory. Additionally, the processing resources may be used to translate, encrypt/decrypt, authenticate, forward and/or route any network data packets received from the switching fabric.

In one embodiment of the present invention, a plurality of netmods, a switching fabric, and a plurality of processing resources are assembled as a network routing/switching device, such as a blade server. The blade server is configured and distributed by Cosine Communications, Inc. of Redwood City, Calif. The system can be assembled with a plurality of additional blade servers that interface with one another. Of course as one of ordinary skill in the art readily appreciates, any hardware, firmware, and/or software configuration designed to achieve the tenets of the present disclosure can be used. Thus, all such configurations are intended to fall within the scope of the present invention.

Reference is made herein to the accompanying drawings that form a part hereof, and in which is shown by way of illustration specific embodiments in which the invention may be practiced. It is to be understood that other embodiments may be utilized and structural changes may be made without departing from the scope of the present invention.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

TERMINOLOGY

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

As used herein, a "network interface" or "netmod" generally refers to a hardware and/or software computing device that connects to telecommunications lines associated with network feeds. Netmods are well known to one of ordinary skill in the art. Netmods come in a variety of configurations and are usually distinguished by the type and number of telecommunication lines that can physically connect to line interface ports of the netmod. Netmods may include firmware and/or software to process raw data being received on a line interface port. Furthermore, some software instructions may be processed within a volatile memory of the netmod. For example, some software instructions permit the recognition and separation of network data packets from a data stream being received over a line interface port.

The term "responsive" includes completely or partially responsive.

FIG. 1 illustrates a diagram of a network packet steering system 100, according to one embodiment of the present invention. According to the present example, the steering system 100 includes a plurality of netmods (e.g., 110 and 120), a switching fabric 112, and a plurality of processing resources (e.g., 124 and 126). The netmods (e.g., 110 and 120) are connected to telecommunication lines associated with other networks (e.g., 130 and 140). Connections to the telecommunications lines are made via line interface ports included within the netmods (e.g., 110 and 120).

The netmods (e.g., 110 and 120) include memory and processing elements for receiving network data packets from the line interface ports or for sending network data packets out over the line interface ports. In some cases, the memory included within the netmods (e.g., 110 and 120) is Static Random Access Memory (SRAM), which is volatile memory permitting fast access to data. Moreover, the netmods (e.g., 110 and 120) are usually associated with a specific type of media channel (e.g., ATM, GigE, TDM, FR, and the like). Additionally, a netmod (e.g., 110 or 120) can be wireless. Thus, netmods (e.g., 110 and 120) need not be physically connected to a telecommunications line, but, rather, can be a transceiver for transmitting and receiving wireless (e.g., Radio Frequency (RF), Infrared (IR), Satellite, and the like) network data packets.

The switching fabric 112 may be hardware, firmware, and, in some instances, software instructions that receive forwarded network data packets from the netmods (e.g., 110 and 120) and rapidly transfer the packet to an appropriate processing resource. Conventionally, switching fabric is hardwired from a specific netmod to a processing resource. The switching fabric 112 can also receive network data packets from a processing resource (e.g., 124 and 126) and forward the network packets along to the appropriate netmod (e.g., 110 and 120).

The processing resources (e.g., 124 and 126) receive network data packets and perform a variety of translations/operations on the network data packets, such as forwarding, routing, encryption/decryption, authentication, and the like.

In one embodiment, the processing resources (e.g., 124 and 126) can be configured through a Graphical User Interface (GUI) application using a configuring software application. The GUI application permits an end-user to assign a unique identifier to a processing resource (e.g., 124 or 126). Moreover, the GUI application permits the end-user to visualize each netmod (e.g., 110 and 120) and each line interface port assigned to each of the netmods (e.g., 110 and 120). The GUI application then permits the end-user to make an association between a uniquely identified processing resource (e.g., 124 or 126) and a netmod (e.g., 110 or 120) or a particular line interface port or a sub-interface associated with a particular netmod module (e.g., 110 or 120).

In one embodiment, the GUI application also permits the end-user to visually inspect the processing and memory capabilities of a particular processing resource (e.g., 124 or 126). Thus, the end-user can intelligently make associations between processing resources (e.g., 124 and 126) and netmods (e.g., 110 and 120) or line interface ports. Moreover, associations can be altered as the network traffic changes to accommodate future needs of the end-user's network. Unlike conventional techniques, the associations between the processing resources (e.g., 124 and 126) and the netmods (e.g., 110 and 120) or line interface ports are not static and hardwired. Rather, with the present invention the associations are dynamic, virtual, and configurable.

Once the associations are made, the processing resource (e.g., 124 or 126) that is being assigned pushes the association as a data structure to the volatile memory (e.g., SRAM) of the appropriate netmod (e.g., 110 or 120). In some embodiments, the data structure is a steering table that includes the identifiers or addresses for the assigned processing resource (e.g., 124 or 126), the assigned netmod (e.g., 110 or 120), and any assigned line interface port identifiers or sub-interface identifiers associated with each netmod (e.g., 110 or 120). When a network data packet is then received on the assigned netmod (e.g., 110 or 120), the table is indexed to determine the assigned processing resource (e.g., 124 or 126) and the processing resource's (e.g., 124 or 126) identifier/address is provided to the switching fabric 112 in order to rapidly steer the network data packet along to the assigned processing resource (e.g., 124 or 126).

In one embodiment, the table also includes a pointer or identifier to a specific process residing on the processing resource (e.g., 124 or 126). The pointer is then automatically used by the processing resource (e.g., 124 or 126) when the network data packet is steered to the processing resource (e.g., 124 or 126) to cause the network data packet to be processed by the specific resource.

In some embodiments, a single processing resource (e.g., 124 or 126) can push multiple associations to multiple netmods (e.g., 110 and 120). Therefore, a single processing resource (e.g., 124 or 126) is capable of receiving and processing network data packets from a plurality of disparate netmods (e.g., 124 and 126) that are associated with disparate media channels (e.g., ATM, GigE, TDM, FR, wireless, and the like).

As one of ordinary skill in the art readily appreciates, this provides tremendous flexibility to a network design since with the teachings of the present disclosure, processing resources (e.g., 124 and 126) can be fully utilized and processing can be more easily load balanced. Therefore, an enterprise can dynamically configure or alter the steering system 100 of the present invention to accommodate changes in the enterprise's network traffic without the need to purchase additional expensive hardware and software solutions.

In some embodiments of the present disclosure, the steering table can be more complex and used to have the netmods (e.g., 110 and 120) perform filter operations on any received network data packet. These filter operations can be used to determine the context (e.g., state) of a netmod (e.g., 110 or 120) when a network data packet is received, determine the present volume of traffic on a netmod (e.g., 110 or 120), and determine the content (e.g., media type) of a network packet. Of course a variety of additional filter operations can be identified in the steering table and processed by the netmods (e.g., 110 and 120). All such filter operations are intended to fall within the broad scope of the present disclosure.

The steering system 100 depicted in FIG. 1 is presented for purposes of illustration only, and as one of ordinary skill in the art appreciates, a variety of additional configurations are permissible within the scope of the present invention. Furthermore, it is readily apparent to one of ordinary skill in the art that the steering table included within the netmods (e.g., 110 and 120) permits the netmods (e.g., 110 and 120) to dynamically acquire intelligence about an incoming network data packet in order to more efficiently steer the incoming data packet. This is a significant improvement over what has been conventionally done, which is statically and rigidly defined in the hardware of the routing/switching computing devices.

Figure 2:
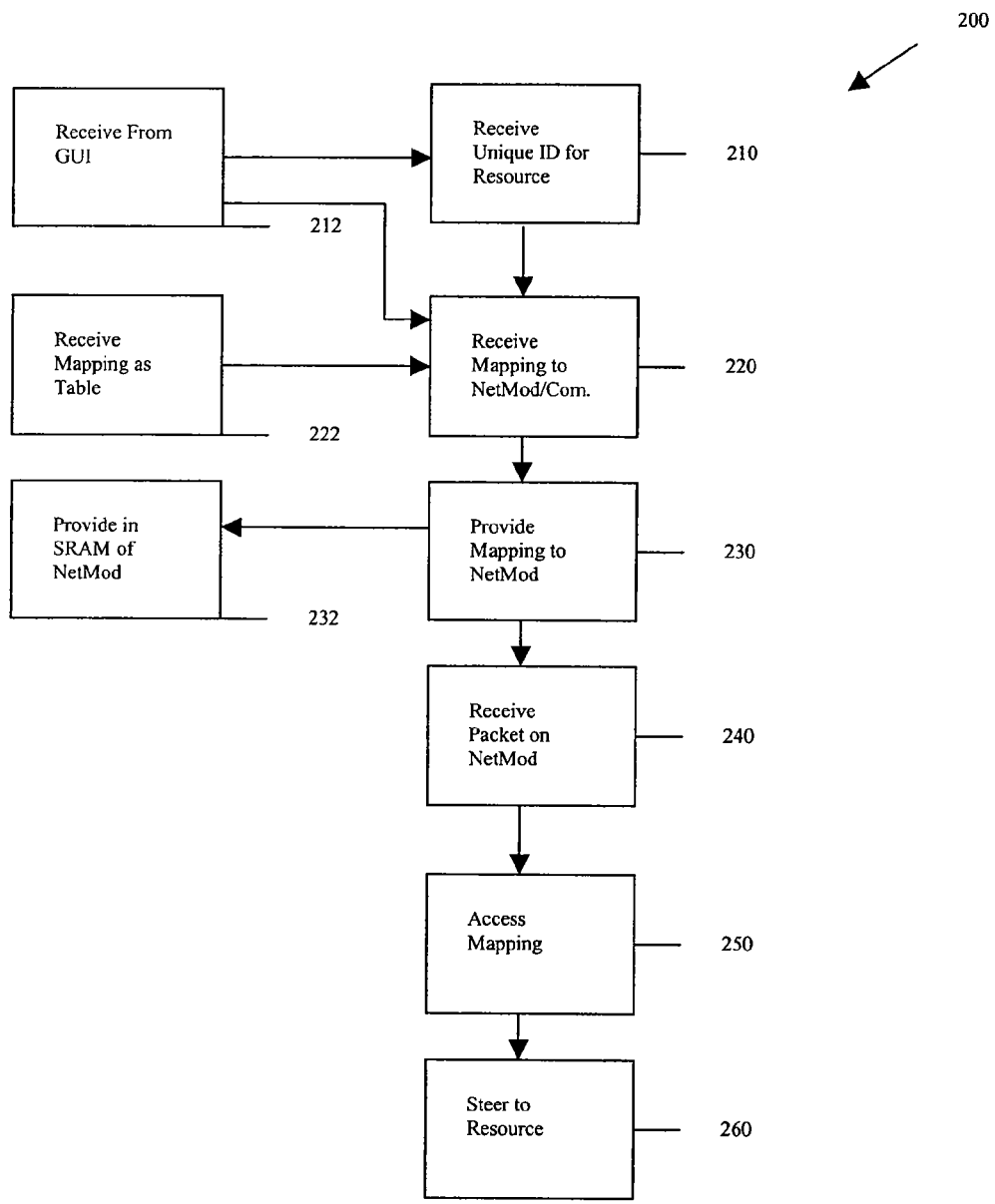
FIG. 2 shows a flow diagram of a method for steering a network packet, according to one embodiment of the present invention.

FIG. 2 illustrates a flow diagram of a method 200 for steering a network packet, according to the present invention. In one embodiment, of FIG. 2 the method 200 is implemented within a high-density server or blade server having a plurality of netmods, a switching fabric, and a plurality of processing resources. Of course, any configuration of computing devices implementing method 200 is intended to fall within the scope of the present disclosure.

In 210, a unique identifier is received by a processing resource. The unique identifier is used to distinguish the processing resource from other processing resources. The processing resource is used to route, forward, authenticate, encrypt/decrypt, or perform other operations against a network packet. In one embodiment, the unique identifier is received from a GUI application interfaced with the processing resource. Moreover, the unique identifier is modifiable and configurable by the GUI application. Of course any software application, including command line interfaces, can be used to provide the processing resource with the unique identifier.

Additionally, a mapping, in 220, is received by the processing resource. The mapping logically associates the unique identifier of the processing resource with a netmod or with one or more components of the netmod. In one embodiment, the components represent line interface ports embodied in the netmod. The netmod receives and transmits network packets from and to other computing devices.

The mapping, in one embodiment, is received from the GUI application. Further, as depicted in 222, and in some cases, the mapping is represented as a table data structure (e.g., steering table) in the memory of the processing resource. The mapping, mapping in some embodiments, includes an identifier/address of the processing resource, an identifier for the netmod, a plurality of identifiers for line interface ports or sub-interfaces included on the netmod, and a pointer to a specific process that resides on the processing resource and is used to process any steered network packets. Additionally, the GUI application can be used to publish to an end-user the processing and memory capabilities of the processing resource. Therefore, the end-user can intelligently create and dynamically alter the mapping based on the end-user's network traffic patterns.

In 230, the mapping is provided by the processing resource to the netmod. In one instance, the mapping is provided as an in RAM (e.g., SRAM, depicted in 232) table data structure to the netmod for more efficient processing by the netmod. Moreover, the mapping can be dynamically pushed to the netmod from the processing resource. In this way, the mapping is configurable and easily altered as network traffic patterns change.

Once the netmod has the mapping, then, in 240, when the netmod receives a network packet, the mapping can be accessed or inspected in 250. Upon inspecting the mapping, the netmod associates the unique identifier/address of the assigned processing resource and any process pointer with the network packet and passes the information off to the switching fabric, which rapidly steers the network packet to the processing resource in 260 and automatically performs any process against the network packet, which was identified by any process pointer.

Therefore, unlike conventional hardwired network switches, the mapping of the present invention represents a virtual switch that permits the netmod to perform Layer 1 and Layer 2 steering on incoming network packets. Moreover, the virtual switch is easily altered and configured to meet the needs of changing network traffic patterns.

Figure 3:
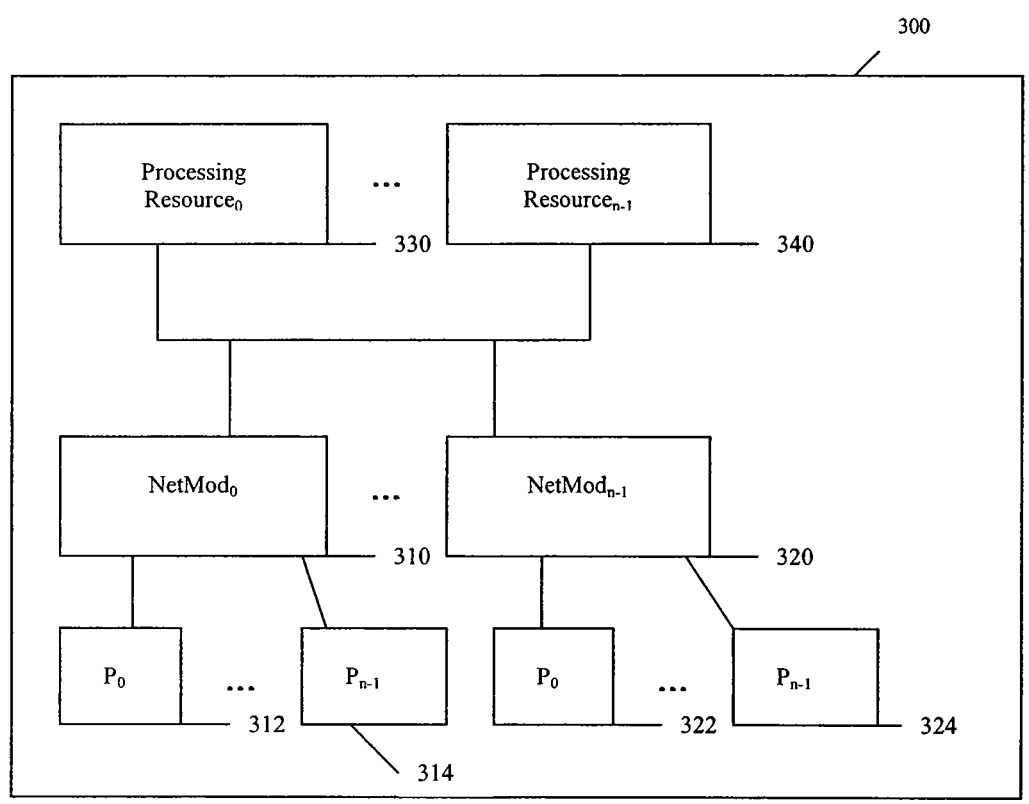
FIG. 3 shows a diagram of network packet steering system, according to an alternative embodiment of the present invention.

FIG. 3 illustrates a diagram of another network packet steering system 300, according to the present invention. The steering system 300 includes one or more netmods (e.g., 310 and 320), one or more processing resources (e.g., 330 and 340). Each netmod (e.g., 310 or 320) includes a plurality of line interface ports (e.g., 312, 314, 322, and 324). Also, in some embodiments, a switching fabric is interposed between the netmods (e.g., 310 and 320) and the processing resources (e.g., 330 and 340) (not depicted in FIG. 3).

The processing resources (e.g., 330 and 340) are configurable, uniquely identified, and assigned to a number of the netmods (e.g., 310 and 320) or to a number of the line interface ports (e.g., 312, 314, 322, and 324). In one embodiment, configuration of the processing resources (e.g., 330 and 340) occurs through a GUI application communicating with the processing resources (e.g., 330 and 340). The GUI application permits dynamic modification to the configured assignment. Moreover, the configured assignment can be intelligently made by an end-user of the GUI application when the processing and memory capabilities of the processing resources (e.g., 330 and 340) are visualized and published through the GUI application to the end-user.

Configured assignments made within the processing resources (e.g., 330 and 340) are pushed from the respective processing resources (e.g., 330 and 340) to the corresponding netmods (e.g., 310 and 320). The configured assignments can be represented as a steering table inside the netmod's (e.g., 310 and 320) volatile memory (e.g., SRAM). The netmods (e.g., 310 and 320) use the configured assignments when receiving an incoming network packet and the unique identifier associated with the appropriate processing resource (e.g., 330 or 340) in order to steer the incoming network packet to the designated processing resource (e.g., 330 or 340).

One technique to access the steering table is to index the incoming network packet into the table by the incoming network packet's channel identifier to acquire the appropriate unique identifier for the processing resource (e.g., 330 or 340). Once the unique identifier is associated with the incoming packet it is readily steered to the designated processing resource (e.g., 330 or 340). Corresponding, the identifier, in some embodiments, is an address for the appropriate processing resource (e.g., 330 or 340). Moreover, in one embodiment, the configured assignment also identifies a pointer to a specific process on the appropriate processing resource (e.g., 330 or 340), which is used to automatically process the incoming packet on the appropriate processing resource (e.g., 330 or 340).

In some instances, the configured assignments can also be used to identify one or more filter operations that the processing resource (e.g., 330 or 340) wants the netmods (e.g., 310 and 320) to perform on the incoming network packet before steering the incoming network packet. Some example filter operations can include, detecting and communicating a current volume of network traffic, detecting and communicating a content format (e.g., media format) of the incoming packet, and detecting and communicating a context (e.g., processing state) associated with the netmods (e.g., 310 and 320) when the incoming network packet is received.

CONCLUSION

Methods and systems detailed above permit improved network packet steering. In various embodiments, these methods and systems facilitate the creation of virtual switches. In contrast, traditional approaches have relied on hardwired and static implementations of switches. Accordingly, embodiments of the present invention permits better utilization and load balancing of an enterprise's network resources.

Furthermore, the virtual switches of embodiments of the present invention are dynamically configurable to meet the changing needs of an enterprise's network traffic. In some embodiments, the configuration of the virtual switches can be altered using a GUI application in communication with a processing resource. Moreover, the processing and memory capabilities of the processing resource can be published and made available within the GUI application. In this way, an enterprise can monitor and alter network traffic as needed in accordance with the teachings of various embodiments of the present invention, without the need to acquire additional hardware and software resources.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method comprising:
    storing, within a memory of each of a plurality of network interfaces of a networking routing/switching device, a dynamically configurable steering table representing a mapping that logically assigns each of the plurality of network interfaces to a packet processing resource of a plurality of packet processing resources of the network routing/switching device, wherein for each of the plurality of network interfaces, the steering table has contained therein information indicative of a unique identifier/address of the assigned packet processing resource of the plurality of packet processing resources;
    responsive to receiving a packet on a particular network interface of the plurality of network interfaces, performing Layer 1 or Layer 2 steering of the received packet to the assigned packet processing resource by which the received packet is to be processed by retrieving the information indicative of the unique identifier/address of the assigned packet processing resource from the dynamically configurable steering table based on a channel identifier associated with the received packet; and
    processing the received packet by the assigned packet processing resource.

2. The method of claim 1, further comprising determining a specific process within the assigned packet processing resource by which the received packet is to be processed.

3. The method of claim 1, wherein one or more filter operations are applied against the received packets prior to performing the Layer 1 or Layer 2 steering.

4. The method of claim 1, further comprising reconfiguring the dynamically configurable steering table responsive to processing or memory capabilities of the plurality of packet processing resources or responsive to operational status of the plurality of packet processing resources.

5. The method of claim 1, further comprising load balancing network traffic among the plurality of packet processing resources based on the dynamically configurable steering tables.

6. The method of claim 5, wherein the load balancing is accomplished by configuring the dynamically configurable steering tables responsive to changes in one or more network traffic characteristics.

7. The method of claim 5, wherein the load balancing is accomplished by configuring the dynamically configurable steering tables to account for differing processing capabilities of the plurality of packet processing resources.

8. The method of claim 1, wherein the dynamically configurable steering table is configured by an end-user through a graphical user interface (GUI) application.

9. A network packet steering system, comprising:
    a plurality of packet processing resources provided by a network routing/switching device;
    a plurality of network interfaces of the network routing/switching device;
    wherein the plurality of packet processing resources are configurable, uniquely identified within the network routing/switching device, and dynamically assigned to one or more network interfaces of the plurality of network interfaces;
    wherein the dynamically configured assignment is accomplished by storing, within a memory of each of the plurality of network interfaces, a steering table representing a mapping that logically assigns each of the plurality of network interfaces to a packet processing resource of a plurality of packet processing resources, and wherein for each of the plurality of network interfaces, the steering table has contained therein information indicative of a unique identifier/address of the assigned packet processing resource of the plurality of packet processing resources;
    wherein the plurality of network interfaces perform Layer 1 or Layer 2 steering of received packets to the assigned packet processing resource by which the received packets are to be processed by retrieving the information indicative of the unique identifier/address of the assigned packet processing resource from the steering table based on a channel identifier associated with the received packets; and
    wherein the received packets are processed by the assigned packet processing resource.

10. The network packet steering system of claim 9, wherein a determination is made by the plurality of network interfaces regarding a specific process within the assigned packet processing resource by which the received packet is to be processed.

11. The network packet steering system of claim 9, wherein one or more filter operations are applied against the received packets prior to performing the Layer 1 or Layer 2 steering.

12. The network packet steering system of claim 9, wherein the steering table is reconfigured responsive to processing or memory capabilities of the plurality of packet processing resources or responsive to operational status of the plurality of packet processing resources.

13. The network packet steering system of claim 9, wherein network traffic is load balanced among the plurality of packet processing resources based on the steering tables.

14. The network packet steering system of claim 13, wherein load balancing is accomplished by configuring the steering tables responsive to changes in one or more network traffic characteristics.

15. The network packet steering system of claim 13, wherein load balancing is accomplished by configuring the steering tables to account for differing processing capabilities of the plurality of packet processing resources.

16. The network packet steering system of claim 9, wherein the steering table is configurable by an end-user through a graphical user interface (GUI) application.

17. The method of claim 1, wherein the steering table further comprises an identifier for the network interface, a plurality of identifiers for line interface ports or sub-interfaces on the network interface, and a pointer to a specific process residing on the processing resource.

18. The method of claim 3, wherein the one or more filtering operations applied against the received packets are applied at the network interfaces, and wherein the steering table is used to have the network interfaces perform filter operations.

19. The network packet steering system of claim 9, wherein the steering table further comprises an identifier for the network interface, a plurality of identifiers for line interface ports or sub-interfaces on the network interface, and a pointer to a specific process residing on the processing resource.

20. The network packet steering system of claim 11, wherein the one or more filtering operations applied against the received packets are applied at the network interfaces, and wherein the steering table is used to have the network interfaces perform filter operations.

\* \* \* \* \*